United States Patent
Meghwani et al.

(10) Patent No.: US 9,445,049 B2
(45) Date of Patent: Sep. 13, 2016

(54) IDENTIFYING AND ENHANCING MOTION VIDEO IN A CONFERENCE CALL CHANNEL BY DETECTING AUDIO

(71) Applicant: Cisco Technology, Inc., San Jose, CA (US)

(72) Inventors: Manju Kumari Meghwani, Kota (IN); Satheesh Babu Sudarsanan, Trivandrum (IN); Prashant Laddha, Morshi (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/464,140

(22) Filed: Aug. 20, 2014

(65) Prior Publication Data
US 2016/0057387 A1     Feb. 25, 2016

(51) Int. Cl.
*H04N 7/15*     (2006.01)
*H04L 29/06*     (2006.01)

(52) U.S. Cl.
CPC ............. *H04N 7/15* (2013.01); *H04L 65/4038* (2013.01)

(58) Field of Classification Search
None
See application file for complete search history.

(56) References Cited

U.S. PATENT DOCUMENTS

| | | | |
|---|---|---|---|
| 2008/0036918 A1* | 2/2008 | Huang | H04N 5/60 348/738 |
| 2008/0059581 A1* | 3/2008 | Pepperell | H04L 12/1827 709/204 |
| 2011/0103468 A1* | 5/2011 | Polisetty | G10L 25/78 375/240.03 |
| 2011/0283008 A1* | 11/2011 | Smelyansky | G09B 5/065 709/231 |
| 2014/0028785 A1 | 1/2014 | Valentine et al. | |
| 2014/0347435 A1* | 11/2014 | Barazany | H04N 7/15 348/14.07 |

OTHER PUBLICATIONS

Wikipedia, "Voice Activity Detection", http://en.wikipedia.org/wiki/Voice_activity_detection, retrieved Aug. 20, 2014, 5 pages.
Nguyen, Blnh, "Sametime Audio and Video Network Bandwidth Requirement", Sep. 12, 2012, http://www-10.lotus.com/ldd/stwiki.nsf/dx/Sametime_Audio_and_Video_Network_Bandwidth_Requirement, 4 Pages.
Avistar, "Product Approach Document Bandwidth Management", Avistar Communications Corporation, Jan. 2009, 11 pages.

* cited by examiner

*Primary Examiner* — Stella L Woo
(74) *Attorney, Agent, or Firm* — Edell, Shapiro & Finnan, LLC

(57) ABSTRACT

Presented herein are techniques for detecting whether a presentation video stream in a conference call includes motion video. In an embodiment, this can be done by detecting the presence of audio. The presence of audio suggests that the presentation video stream may include motion video. If audio is not detected, then the presentation video stream is encoded at a first frame rate. If audio is detected, then the presentation video stream is encoded at a second, higher frame rate to accommodate the motion video. The higher frame rate allows for a better viewing experience by conference participants.

17 Claims, 6 Drawing Sheets

IDENTIFYING AND ENHANCING MOTION VIDEO IN A CONFERENCE CALL CHANNEL BY DETECTING AUDIO

TECHNICAL FIELD

The present disclosure relates to video processing.

BACKGROUND

Conference technology currently allows for video communications among participants in addition to audio communications. Typically a presenter will have two video streams at his disposal. The first stream may be considered a main video stream, which would show the output of the presenter's camera, e.g., the presenter's head shot. A second stream would be used for a presentation. Examples of a presentation could include a view of the presenter's computer desktop or the output of particular application, such PowerPoint™ or a web browser, for example.

The main video stream may have to capture motion, such as the gestures and facial movements of the presenter; the presentation stream does not necessarily have to accommodate significant motion. The motion video content of a Power Point™ presentation is generally minimal, for example. As a result the presentation stream is typically encoded at a lower frame rate than the main video stream. In some conferencing systems, the presentation stream may be encoded at 5 or 10 frames per second (fps), while the main stream may be encoded at 30 or 60 fps.

There may be situations, however, where the presentation stream of the conference call needs to accommodate video. The presenter may wish to share a video clip for example. The presenter may have a multimedia file that he wishes to share, or he may want to share a video being streamed from the Internet. In such cases, the presentation stream's limited frame rate of 5 or 10 fps may result in an unacceptably low quality viewing experience for the other participants in the conference call.

DESCRIPTION OF EXAMPLE EMBODIMENTS

Overview

Presented herein are techniques for detecting whether a presentation video stream in a conference call includes motion video. In an embodiment, this can be done by detecting the presence of audio. The presence of audio suggests that the presentation video stream may include motion video. If audio is not detected, then the presentation video stream is encoded at a first frame rate. If audio is detected, then the presentation video stream is encoded at a second, higher frame rate to accommodate the motion video. The higher frame rate allows for a better viewing experience by conference participants.

Example Embodiments

Figure 1:
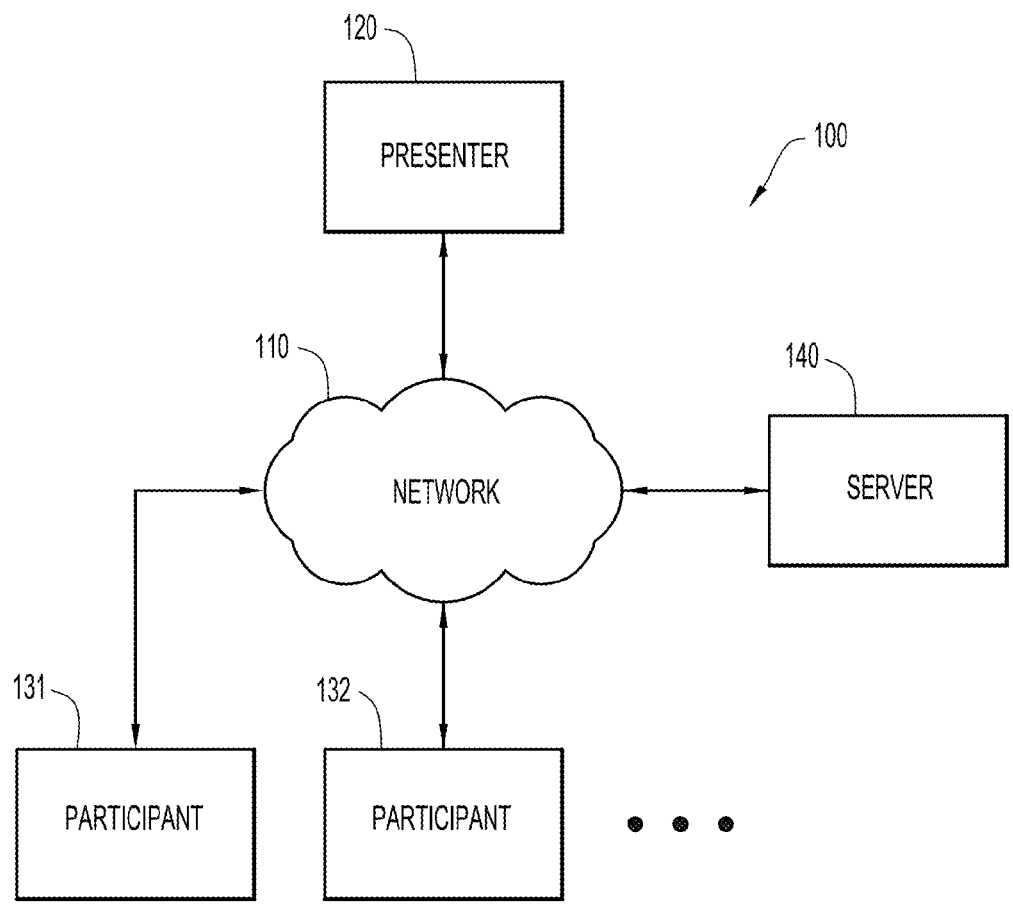
FIG. 1 illustrates a system in which the apparatus and processing described herein may operate, according to an example embodiment.

Referring to FIG. 1, an online conference system 100 is shown. Using the illustrated system, users can have an online conference call (e.g., a web meeting) in which they can share voice, video, chat, and/or other types of data communication through participant devices 120 and 131, 132, . . . over network 110. Presenter device 120 represents a computing and communications device, such as a desktop or laptop computer, or a mobile device, such as a tablet or smart phone. In an embodiment, presenter device 120 may actually represent a plurality of devices through which a user may make a presentation. Other users in the conference call may view, hear, speak, or otherwise take part in the conference call using participant devices 131, 132, . . . . As in the case of presenter device 120, the participant devices 131, 132, . . . may each be any of a variety of computing and communication devices, such as such as a desktop or laptop computer, or a mobile device. Presenter device 120 and/or participant devices 131, 132, . . . may also be dedicated videoconferencing devices, and may represent components of a standalone conferencing system. In alternative embodiments, any of the illustrated participant devices may represent a plurality of devices through which a user may take part in a conference.

Figure 2:
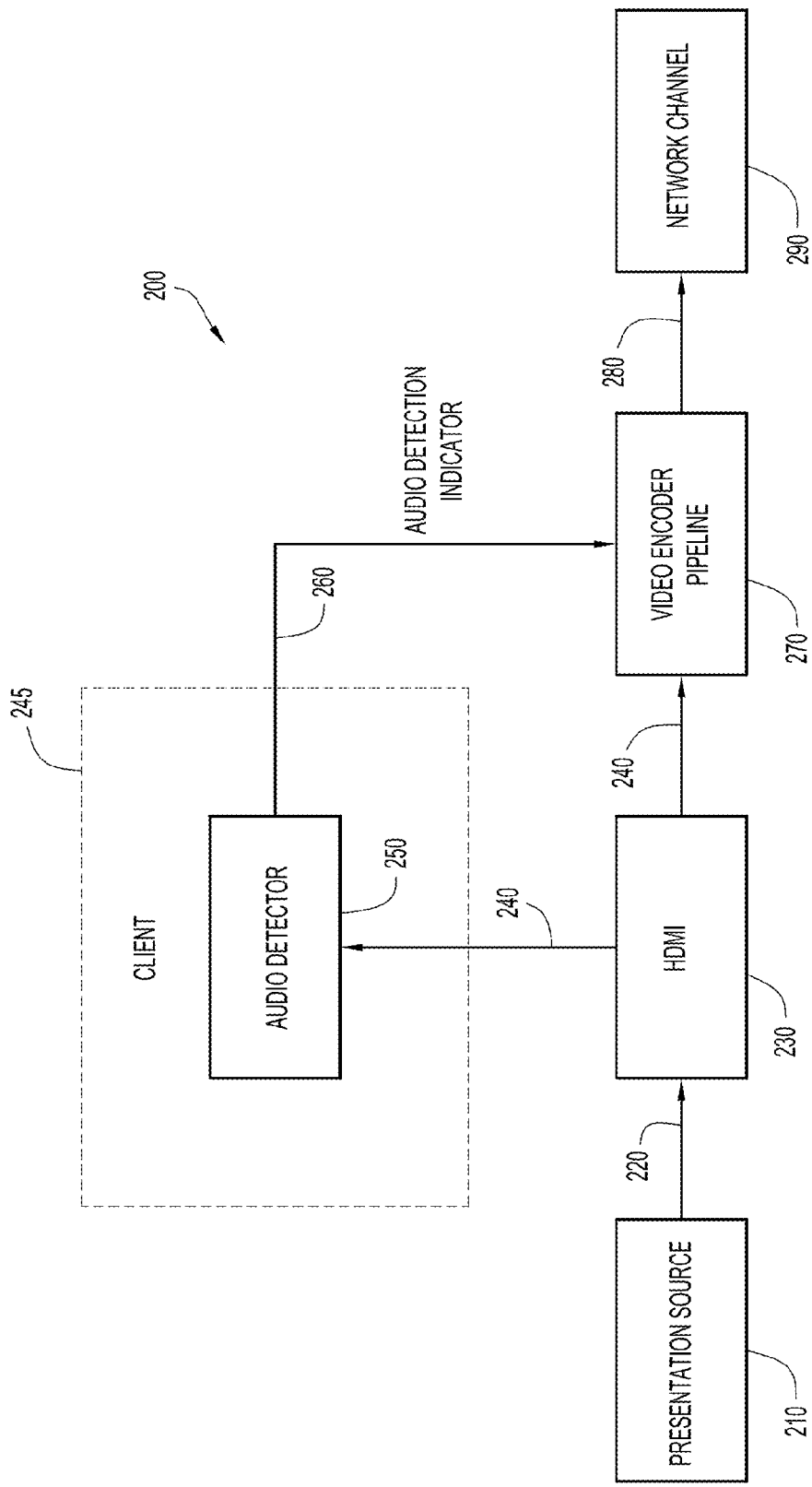
FIG. 2 is a block diagram illustrating components of an apparatus described herein, according to an example embodiment.

Network 110 may be any type of network (e.g., any combination of Internet, intranet, local area network (LAN), wide area network (WAN), wired network, wireless network, etc.) that connects computing devices, e.g., presenter device 120 and participant devices 131, 132, . . . . Server 140 is used to mediate communications between presenter device 120 and the participant devices 131, 132, . . . . In various embodiments, server 140 may perform caching of data shared among users, or perform other time/bandwidth conserving processes. In the illustrated conference system, each device may communicate with the server 140 through a browser application having one or more plug-ins that enable a network-based meeting experience. The browser allows for the transmission of data to the server 140, and the reception of data from the server 140 during a conference session. In alternative embodiments, a browser is not used. Instead a different, dedicated software application may be used to reach other devices and server(s) in a conference. An example of the components at a presenter device is shown in FIG. 2, according to an embodiment. A presentation source 210 is shown providing data 220 to a high definition multi-media interface (HDMI) 230. In an embodiment, the presentation source 210 may be a source of data to be processed as described herein. Presentation source 210 may be an application program or one or more media buffers for storage of output from such an application, for example. Data 220 represents a presentation video stream, e.g., the contents of the output buffer(s). Such data in its various forms throughout the process described herein may also be referred to as a presentation. The HDMI 230 then formats the presentation as data 240 and forwards it to a video encoder pipeline 270. In alternative embodiments, other communications modes may be used instead of HDMI. The presentation may be input to a wireless or Ethernet interface, for example and without limitation.

Data 240 is also read by an audio detector 250. In an embodiment, the audio detector 250 may be incorporated in a presentation client 245. As would be understood by a person or ordinary skill in the art, presentation client 245 and audio detector 250 may be implemented as software, firmware, hardware, or some combination thereof. The audio detector 250 makes a determination as to the presence of audio in data 240. This determination is output in the form of an audio detection indicator 260. In an embodiment, the audio detection indicator 260 is a binary indication of the presence of audio in data 240.

The audio detection indicator 260 is sent from the audio detector 250 to video encoder pipeline 270. Here, a decision is made regarding how to encode data 240. In an embodiment, the data 240 may be video encoded at one of two frame rates. If no audio is detected at audio detector 250, then this is so indicated by the audio detection indicator 260, and in response, the data 240 is encoded at a first frame rate in the video encoder pipeline 270. In different embodiments, this frame rate is 5 or 10 fps.

If audio is detected at audio detector 250, then this is so indicated by the audio detection indicator 260, and in response the data 240 is encoded at a different, second frame rate in the video encoder pipeline 270. Given that audio has been detected, motion video is likely to be present. A frame rate greater than the first frame rate is therefore desirable. In various embodiments, this second frame rate is 30 or 60 fps.

Encoded video 280 (at whichever frame rate) is then output to network channel 290 and communicated. In the embodiment of FIG. 1, this communication proceeds via network 110 to server 140, from which the video 280, encoded at the determined frame rate, may be distributed to participant devices.

In an embodiment, encoding the video at a particular frame rate may also entail a particular resolution. For a higher frame rate, the resolution may be lower; for a lower frame rate, the resolution may be higher. For example, if audio has not been detected, the video may be encoded at a 5 fps and a resolution of 1920×1080 pixels. If audio has been detected, then motion video is likely present, and the video may be encoded at a higher frame rate, e.g., 30 fps, but at a lower resolution, such as 1280×720 pixels. This allows for some stability in the amount of bandwidth required, regardless of which frame rate is chosen. In an alternative embodiment, stability in the amount of bandwidth may not be a requirement. In these circumstances, the communications system may have more flexibility, such that significant variations may be tolerated in the amount of bandwidth required. Here, the frame rate may be increased if audio is detected, but the resolution may not necessarily change.

Figure 3:
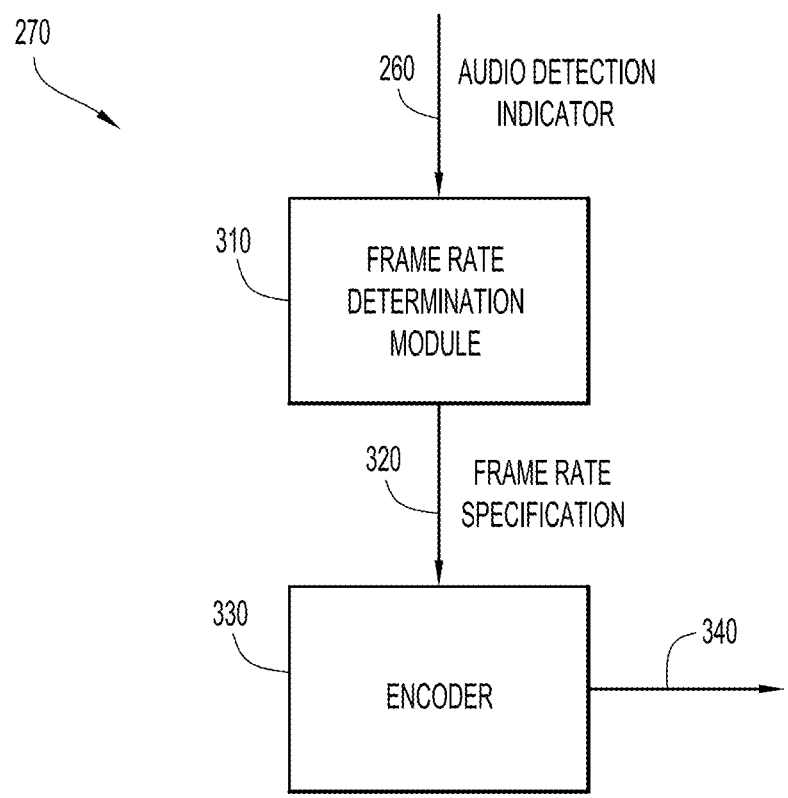
FIG. 3 is a block diagram illustrating logic in a video encoder pipeline, according to an example embodiment.

Logic within the video encoder pipeline 270 is shown in greater detail in FIG. 3, according to an embodiment. The audio detection indicator 260 is input to a frame rate determination module 310. Depending on the value of the audio detection indicator 260, a flag (not shown) is set or reset in the frame rate determination module 310. In various embodiments, such a flag may be a software variable, and/or may take the form of a writable setting in hardware, e.g., a toggle switch or latch. This flag may then be read by video encoder 330. The value of the flag serves to effectively specify a particular frame rate, and is therefore shown as frame rate specification 320. Depending on the value of the frame rate specification 320, the encoder 330 proceeds to encode the video data at one of the two possible frame rates.

In various embodiments, the video encoder 330 may be implemented in software, firmware, hardware, or any combination thereof.

The systems illustrated in FIGS. 2 and 3 show initial audio detection being performed by an audio detector 250 in presentation client 245. In an alternative embodiment, this may be performed instead in the video encoder pipeline 270. The presentation would then be encoded at a frame rate appropriate to whether the presentation contains motion video, as implied by the presence or absence of audio in the presentation.

Figure 4:
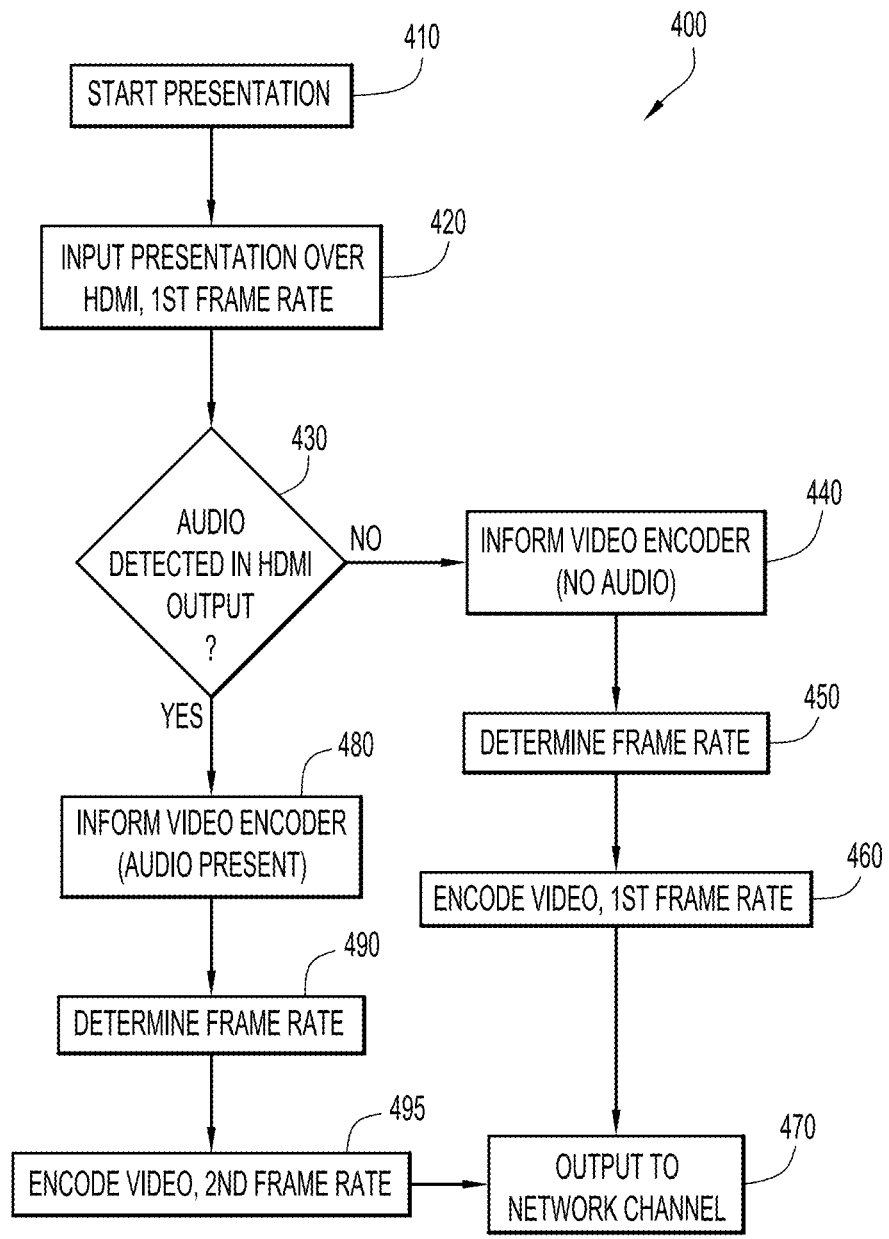
FIG. 4 is a flowchart illustrating processing described herein, according to an example embodiment.

Processing of the system described herein is illustrated by the flowchart 400 shown in FIG. 4, according to an embodiment. At 410, a presentation is started at the presenter device. At 420, data representing the presentation is input to an HDMI interface. In alternative embodiments, other communications modes may be used instead of HDMI. The presentation may be input to a wireless or Ethernet interface, for example and without limitation. At 430, a determination is made as to whether the presentation contains audio. As noted above, in an embodiment, this determination may be made by audio detector logic in a presentation client on the basis of the presentation as received from the HDMI. In an alternative embodiment, this determination is made in an encoder pipeline.

If audio is not detected at 430, then processing continues at 440. Here, the audio detector informs the video encoder that there is no audio has been detected. At 450, a frame rate is determined based on the absence of audio and the implied absence of motion video. At 460, the encoding of the presentation takes place at the determined frame rate. The encoded presentation is then output to a network channel at 470.

If audio is detected at 430, then processing continues at 480, where the audio detector informs the video encoder that audio was detected. At 490, a different frame rate is determined based on the presence of audio and the implied presence of motion video. At 495, the encoding of the presentation takes place at the latter frame rate. The encoded presentation is then output to a network channel at 470. As discussed above, this frame rate is higher than the frame rate used when no audio has been detected.

Figure 5:
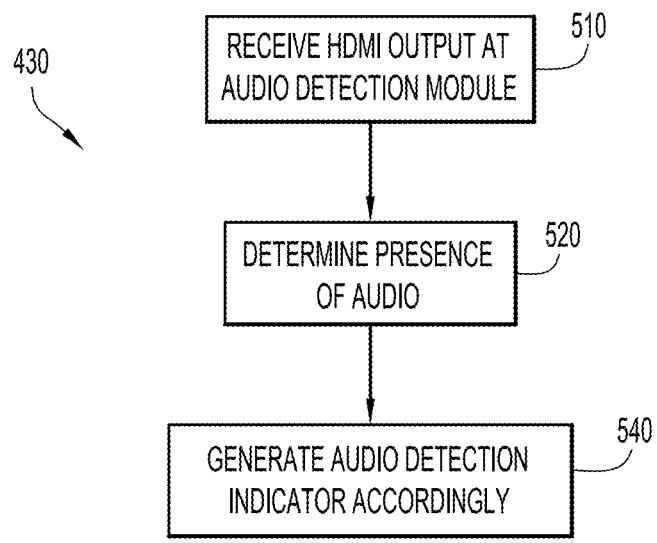
FIG. 5 is a flowchart illustrating the detection of audio, according to an example embodiment.

The determination of whether audio is present in the presentation (operation 430 of FIG. 4) is shown in greater detail in FIG. 5, according to an embodiment. At 510, data representing the presentation is received from the HDMI at the audio detection module. At 520, this data is scanned so that the presence of audio is determined. At 540, the audio detection indicator is generated on the basis of this determination. The audio detection indicator can then be sent to the encoder pipeline as shown in FIG. 2.

Figure 6:
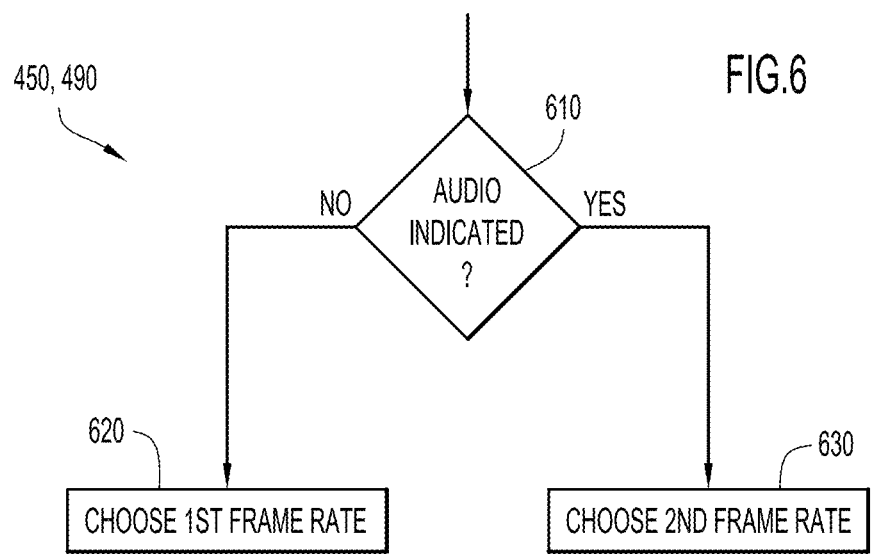
FIG. 6 is a flowchart illustrating frame rate determination, according to an example embodiment.

Frame rate determination (450 and 490 of FIG. 4) is illustrated in greater detail in FIG. 6, according to an embodiment. At 610, a determination is made as to whether the presence of audio has been indicated. This indication takes the form of the audio detection indicator and the corresponding flag discussed above according to an embodiment. If there is no such an indication, then at 620 the first frame rate is chosen; if there is such an indication, then at 630 the second frame rate is chosen. As described above, the second frame rate is higher than the first frame rate, in order to accommodate the motion video that is implied by the presence of audio in the presentation.

Figure 7:
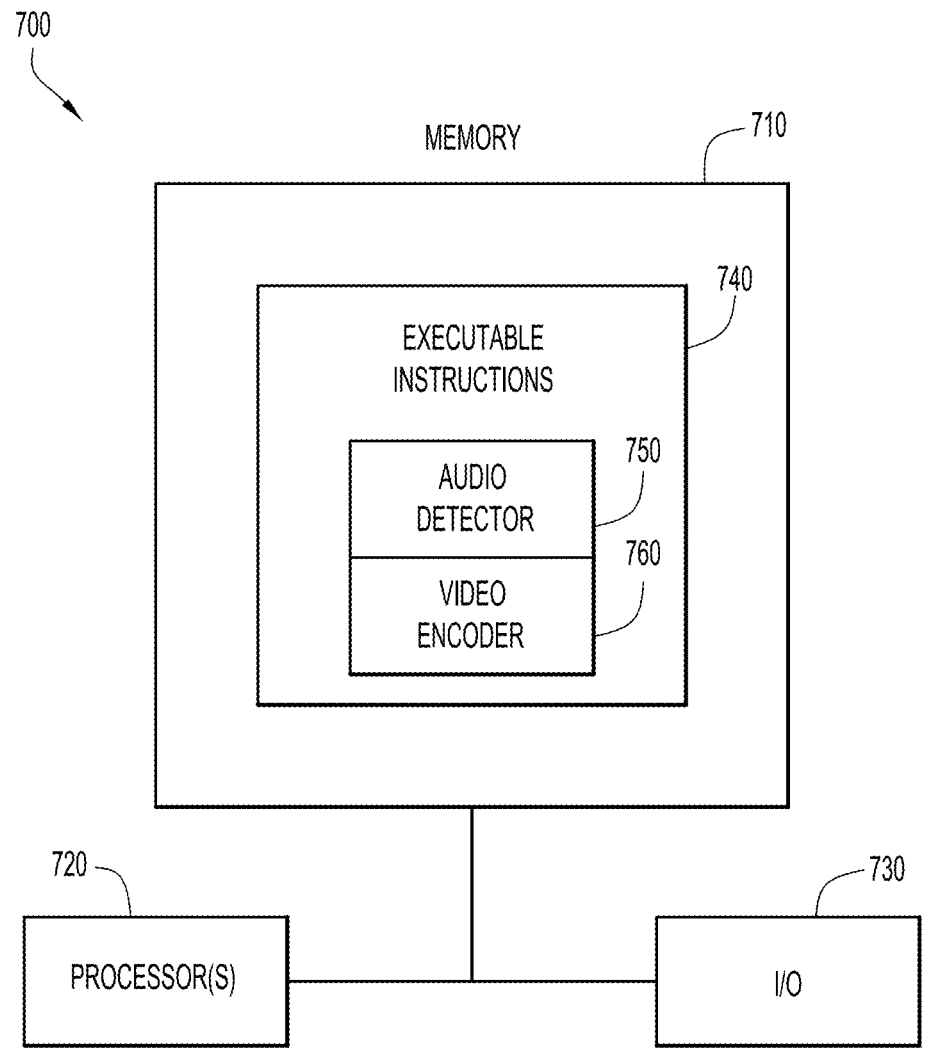
FIG. 7 is a block diagram illustrating a computing environment of a software implementation, according to an example embodiment.

In an embodiment, audio detection is implemented in software or firmware. A software embodiment is illustrated in FIG. 7. Computing system 700 is part of the presenter device in an embodiment. System 700 includes one or more memory devices, shown collectively as memory 710. Memory 710 is in communication with one or more processors 720 and input/output ports and devices shown collectively as I/O 730.

Memory 710 may comprise read only memory (ROM), random access memory (RAM), magnetic disk storage media devices, optical storage media devices, flash memory devices, electrical, optical, or other physical/tangible (i.e., non-transitory) memory storage devices.

Memory 710 stores data as well as executable instructions 740. Instructions 740 are executable on processor(s) 720. The processor(s) 720 comprise, for example, a microprocessor or microcontroller that executes instructions 740, including the instructions that represent the audio detector 750 and video encoder 760. Thus, in general, the memory 710 may comprise one or more tangible (non-transitory) computer readable storage media (e.g., memory device(s)) encoded with software comprising computer executable instructions. When the software is executed (by the processor(s) 720) the software is operable to perform the operations described herein in connection with audio detector 750 and video encoder 760.

In an embodiment, I/O 730 comprises an HDMI, such as HDMI 230 of FIG. 2. Such an interface represents an input device from which audio detector 750 can receive data representing a presentation. I/O 730 also comprises an interface to network channel 290. Such an interface represents an output device for encoded video produced by encoder 760.

In the above embodiment, instructions representing the video encoder 760 are shown executing on processor(s) 720. In an alternative embodiment, the video encoder's instructions may execute on a different processor or processors than the processor(s) that execute the instructions representing audio detector 750. Moreover, the instructions representing the video encoder 760 may also reside in a memory device separate from the device in which the audio detector 750 resides. In an alternative embodiment, the video encoder may be implemented in hardware.

In summary, the techniques presented herein are based on the fact that a presentation that has embedded video is always accompanied with audio. Detecting embedded audio is used as augmenting mechanism to inherently detect the embedded video. This mechanism to detect embedded audio in a presentation is faster and computationally less intensive than other techniques heretofore known.

Thus, in one form, a method is provided comprising: at a device from which content for a presentation is shared in a conference session, determining if audio is present in the presentation as indicative of presence of motion video in the content; if audio is not present in the presentation, encoding the presentation at a first frame rate; and if audio is present in the presentation, encoding the presentation at a second frame rate that is greater than the first frame rate.

Likewise, an apparatus is provided comprising: a processor programmed to execute a presentation client that determines if audio is present in content of a presentation as indicative of presence of motion video in the content; and a video encoder configured to encode the presentation at a first frame rate when audio is not present in the presentation, and to encode the presentation at a second frame rate when audio is present in the presentation, wherein the second frame rate is greater than the first frame rate.

Further still, one or more computer readable non-transitory storage media are provided encoded with software comprising computer executable instructions that when executed by a processor, cause the processor to: determine if audio is present in content of a presentation as indicative of presence of motion video in the content; if audio is not present in the presentation, encode the presentation at a first frame rate; and if audio is present in the presentation, encode the presentation at a second frame rate that is greater than the first frame rate.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the example embodiments disclosed herein.

What is claimed is:

1. A method comprising:
   at a device from which a presentation is shared in a conference session, wherein the presentation comprises a main video stream and a presentation stream:
   determining if audio is present in the presentation stream as indicative of a presence of embedded video content in the presentation stream;
   generating an audio detection indicator signal indicative of the presence of the audio in the presentation stream;
   supplying the audio detection indicator signal to a video encoder to enable encoding of the presentation stream at a first frame rate or second frame rate, wherein the second frame rate is greater than the first frame rate;
   dynamically changing the frame rate at which the presentation stream is encoded depending on the audio detection indicator signal such that if the audio detection indicator signal indicates that audio is not present in the presentation stream, encoding the presentation stream at the first frame rate, and if the audio detection indicator signal indicates that audio is present in the presentation stream, encoding the presentation stream at the second frame rate;
   wherein the generating and the supplying of the audio detection signal are performed after the determining if audio is present and before the encoding of the presentation stream.

2. The method of claim 1, wherein the encoding of the presentation stream at the first frame rate comprises encoding the presentation at a first resolution, and the encoding of the presentation stream at the second frame rate comprises encoding the presentation at a second resolution that is lower than the first resolution.

3. The method of claim 2, wherein the first resolution is 1920×1080 pixels and the second resolution is 1280×720 pixels.

4. The method of claim 1, wherein the first frame rate is 5 frames per second and the second frame rate is 30 frames per second.

5. The method of claim 1, further comprising:
   reading the presentation from a high-definition multimedia interface (HDMI) output, performed before the determining,
   wherein the determining is performed on the basis of the presentation as read from the HDMI output.

6. An apparatus comprising:
   a processor programmed to execute a presentation client, wherein a presentation comprises a main video stream and a presentation stream, the processor further programmed to:

determine if audio is present in the presentation stream as indicative of a presence of embedded video content in the presentation stream;

generate an audio detection indicator signal indicative of the presence of the audio in the presentation stream;

supply the audio detection indicator signal to a video encoder to enable encoding of the presentation stream at a first frame rate or second frame rate, wherein the processor generates and sends the audio detection indicator signal after determining if audio is present in the presentation stream and before encoding of the presentation stream; and a video encoder configured to dynamically change the frame rate at which the presentation stream is encoded depending on the audio detection indicator signal such that that the video encoder encodes the presentation stream at the first frame rate if the audio detection indicator signal indicates that audio is not present in the presentation stream, and encodes the presentation stream at the second frame rate if the audio detection indicator signal indicates that audio is present in the presentation stream, wherein the second frame rate is greater than the first frame rate.

7. The apparatus of claim 6, wherein the video encoder is further configured to encode the presentation at a first resolution when encoding the presentation stream at the first frame rate, and to encode the presentation stream at a second resolution when encoding the presentation at the second frame rate, wherein second resolution is lower than the first resolution.

8. The apparatus of claim 7, wherein the first resolution is 1920×1080 pixels and the second resolution is 1280×720 pixels.

9. The apparatus of claim 6, wherein the first frame rate is 5 frames per second and the second frame rate is 30 frames per second.

10. The apparatus of claim 6, wherein the presentation client reads the presentation from a high-definition multimedia interface (HDMI) output, performed before the determining of whether audio is present, wherein the determining is performed on the basis of the presentation as read from the HDMI output.

11. One or more computer readable non-transitory storage media encoded with software comprising computer executable instructions that when executed by a processor, cause the processor to:

determine for a presentation comprising a main video stream and a presentation stream, if audio is present in the presentation stream as indicative of a presence of embedded video content in the presentation stream;

generate an audio detection indicator signal indicative of a presence of the audio in the presentation stream;

supply the audio detection indicator signal to a video encoder to enable encoding of the presentation stream at a first frame rate or a second frame rate;

dynamically change the frame rate at which the presentation stream is encoded depending on the audio detection indicator signal such that if the audio detection indicator signal indicates that audio is not present in the presentation stream, encode the presentation stream at the first frame rate, and if the audio detection indicator signal indicates that audio is present in the presentation stream, encode the presentation stream at the second frame rate that is greater than the first frame rate;

wherein the operations to generate and supply the audio detection indicator signal are performed after determining whether audio is present in the presentation stream and before encoding of the presentation stream.

12. The computer readable storage media of claim 11, wherein the instructions that cause the processor to encode the presentation at the first frame rate comprise instructions for encoding the presentation stream at a first resolution, and the instructions that cause the processor to encode the presentation at the second frame rate cause comprise instructions for encoding the presentation stream at a second resolution, wherein the second resolution is lower than the first resolution.

13. The computer readable storage media of claim 12, wherein the first resolution is 1920×1080 pixels.

14. The computer readable storage media of claim 12, wherein the second resolution is 1280×720 pixels.

15. The computer readable storage media of claim 11, wherein the first frame rate is 5 frames per second.

16. The computer readable storage media of claim 11, wherein the second frame rate is 30 frames per second.

17. The computer readable storage media of claim 11, further comprising executable instructions that when executed by the processor, cause the processor to read the presentation from a high-definition multimedia interface (HDMI) output, performed before determining if audio is present, wherein determining whether audio is present is performed on the basis of the presentation as read from the HDMI output.

* * * * *